2,893,923
Patented July 7, 1959

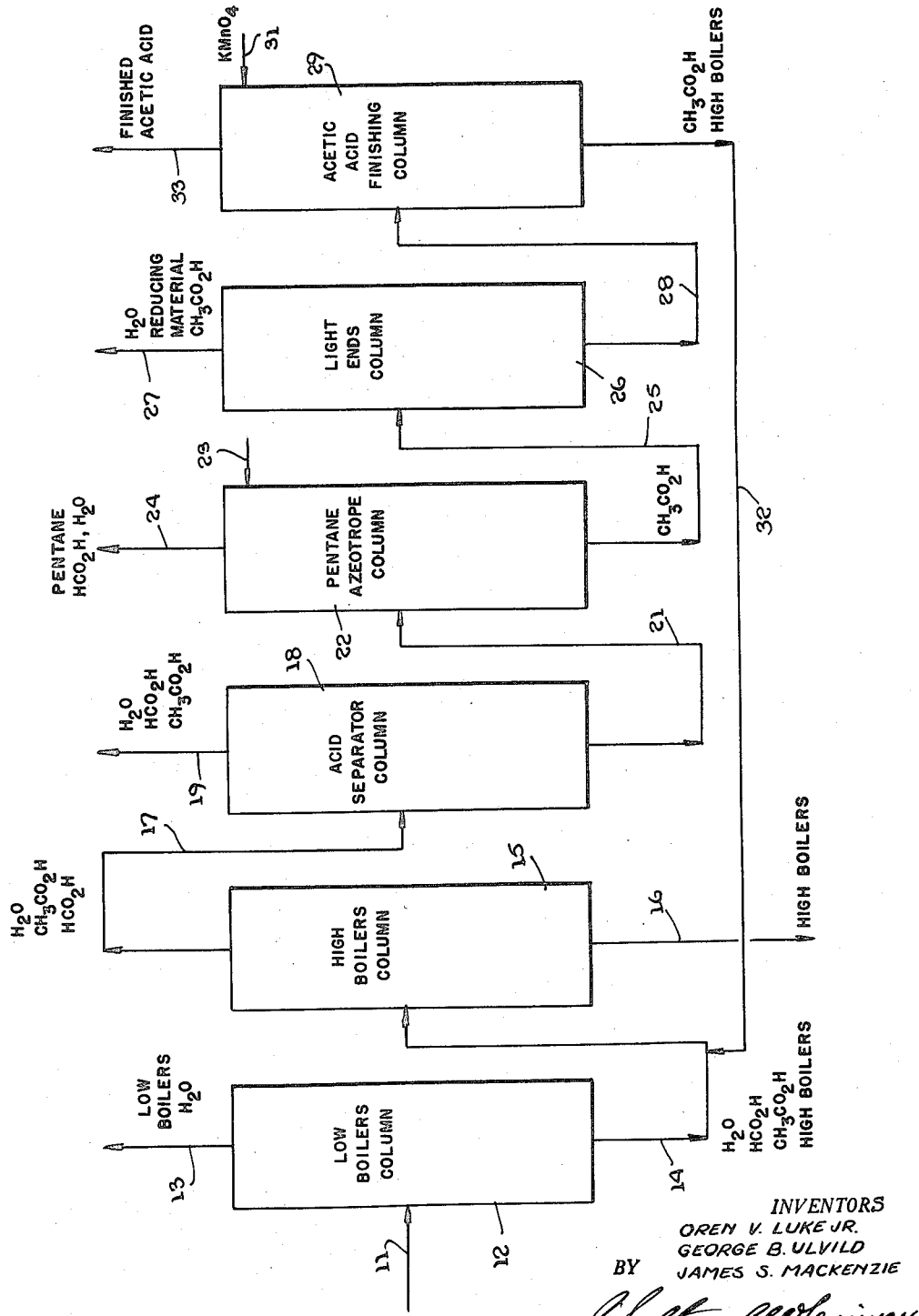

2,893,923

PURIFICATION OF ACETIC ACID BY AZEOTROPIC DISTILLATION

Oren V. Luke, Jr., Corpus Christi, George B. Ulvild, Robstown, and James S. MacKenzie, Corpus Christi, Tex., assignors to Celanese Corporation of America, New York, N.Y., a corporation of Delaware Application May 28, 1954, Serial No. 433,096

8 Claims. (Cl. 202—42)

This invention relates to the production of acetic acid and relates more particularly to an improved process for the production of acetic acid of high purity.

In the production of acetic acid by the liquid phase oxidation of hydrocarbons, such as butane, there is obtained a product stream comprising a complex mixture containing a major proportion of acetic acid together with water, formic acid, and compounds boiling below 100° C. such as acetaldehyde, methyl formate, methyl acetate, ethyl acetate, acetone, methyl ethyl ketone, methanol and higher alcohols, etc., as well as high boiling compounds such as propionic acid, butyric acid, glycol esters and small amounts of condensation products. The purification of the acetic acid involves the removal therefrom of the water, formic acid and both the low boiling and high boiling compounds.

Phelps et al. application Ser. No. 258,722, filed November 28, 1951, discloses a process for the recovery of purified acetic acid from a product stream of this nature according to which process the said stream is first subjected to an azeotropic distillation, employing an aliphatic hydrocarbon having 5 to 6 carbon atoms as the entraining agent, to remove therefrom water and formic acid. The acetic acid is then subjected to two fractional distillations to obtain a purified acetic acid of a concentration of 99.5 to 99.9% by weight.

The purified acetic acid produced by the process described in the Phelps et al. application is well suited for many purposes, such as the production of acetic anhydride and the like. However, the purified acetic acid has a low permanganate time when tested as set forth in the United States Pharmacopeia, 14 revision, page 15. As a result, its utility for certain purposes is limited.

It is an important object of the present invention to provide a process for the production of acetic acid which will be free from the foregoing and other disadvantages.

A further object of this invention is to provide a process for the production of acetic acid of high purity.

Other objects of this invention will be apparent from the following detailed description and claims.

According to the present invention, acetic acid having a high purity and a good permanganate time may be produced by first subjecting the crude acetic acid stream to two distillations in separate columns, one of the distillations being to remove low boiling and the other high boiling compounds from the acetic acid and then subjecting the product stream from the first two distillations to two additional distillations in separate columns, one of said additional distillations being to remove small amounts of low boiling and the other small amounts of high boiling compounds from the acetic acid. The low boilers in the second set of distillations are of different kind and degree than the low boilers in the first set of distillations. The low boilers in the second set of distillations are hereinafter called light ends. During the second of the distillations to remove high boiling compounds from the acetic acid a solution of potassium permanganate is brought into contact with the reducing materials present in acetic acid, for example, by introducing the potassium permanganate into the distillation column at one or more points. The acetic acid stream is also subjected to an azeotropic distillation to remove water and formic acid therefrom, advantageously in the manner disclosed in the Phelps et al. application, referred to above. The azeotropic distillation to remove the water and formic acid should precede the last set of two distillations of the acetic acid in which light ends and high boiling compounds are removed from the acetic acid and should advantageously follow the first set of two distillations in which low boiling and high boiling compounds are removed from the acetic acid.

The reducing materials in the acetic acid, which cause the low permanganate time thereof, are small amounts of diacetyl and related compounds whose boiling point is below that of acetic acid and which exist in equilibrium with their condensation products whose boiling point is above that of acetic acid. The diacetyl and related compounds in the acetic acid will form condensation products at room temperatures so that freshly distilled acetic acid containing these compounds will often develop a dark color. When the acetic acid containing these reducing materials is distilled, for example, to remove high boiling compounds therefrom a portion of the high boiling condensation products will be split up to regenerate the low boiling parent materials which will remain in the acetic acid. Similarly, when the acetic acid is distilled to remove low boiling materials therefrom, a portion of the low boiling parent reducing materials will condense to high boiling compounds which will remain in the acetic acid. A single set of distillations is, therefore, quite inadequate to improve the permanganate time of the acetic acid to any significant extent. Two sets of distillations will bring the permanganate time of the acetic acid to a fairly high value of up to 1.75 hours. However, to increase the permanganate time to above 2.0 hours, it is necessary to contact the acetic acid containing reducing materials with potassium permanganate during the second of the distillations in which small amounts of high boiling compounds are removed. Surprisingly enough, other oxidizing agents, such as sodium dichromate, are not effective in increasing the permanganate time when they are introduced into the distillation column where the second of the distillations to remove high boiling compounds is being carried out.

The figure shows diagrammatically a flow sheet of a preferred embodiment of this invention.

The purification of the acetic acid may be carried out with several different arrangements of the distillation columns. According to the first and preferred arrangement, the crude acetic acid stream is first distilled to remove low boilers therefrom, is next distilled to remove high boilers therefrom, is next distilled to remove a dilute aqueous solution of acetic and formic acids therefrom and is next distilled to remove the remaining water and also formic acid therefrom with the aid of an azeotroping agent. The acetic acid is then again distilled to remove light ends therefrom, following which it is distilled to remove high boilers therefrom while a solution of potassium permanganate is injected into the column at one or more points.

In operating according to this first arrangement, the crude acetic acid stream is introduced into an intermediate point of a column operating at a reflux ratio of between about 5 and 10 to 1, a head temperature of between about 60 and 95° C. and a base temperature of between about 95 and 110° C. wherein low boiling compounds are distilled overhead. The stream from the base of this first column is introduced into an intermediate point in a second column operated at a reflux ratio of between about 1 and 3 to 1, a head temperature of between about 110 and 118° C. and a base temperature of between about 130 and 160° C. wherein the acetic acid is distilled overhead and the high boilers are withdrawn from the base.

The acetic acid at this point contains some water and formic acid and is introduced into an intermediate point of a third column operated at a reflux ratio of between about 1 and 3 to 1, a head temperature of between about 90 and 110° C. and a base temperature of between about 110 and 120° C. In this column, a dilute aqueous solution of acetic and formic acids is distilled overhead, leaving behind a more concentrated solution of acetic acid still containing some formic acid. A stream from the base of the third column is introduced into an intermediate point in a fourth column operated at an entrainer to overhead product take-off ratio of between about 30 and 50 to 1, a base temperature of between about 118 and 150° C. and a head temperature of between about 34 and 37.° C. at atmospheric pressure when employing pentane as the azeotroping agent. It is frequently desirable to carry out this distillation at superatmospheric pressures in which case the head temperatures will be higher, their exact value depending on the pressure. Pentane or hexane is introduced into this column as an azeotroping agent at a rate sufficient to obtain the desired entrainer ratio. There is distilled overhead an azeotrope containing water and formic acid together with the azeotroping agent. The formic acid and water are continuously removed from the azeotroping agent by a phase separation.

The stream from the base of the fourth column, which consists of partially purified acetic acid is then introduced into an intermediate point of a fifth column operated at a reflux ratio of between about 10 and 15 to 1, a head temperature of between about 115 and 118° C., and a base temperature of between about 118 and 120° C. wherein small amounts of light ends are distilled overhead. The stream from the base of the fifth column is introduced into an intermediate point in a sixth column operated at a reflux ratio of between about 1 and 3 to 1, a head temperature of between about 117 and 119° C., and a base temperature of between about 118 and 120° C. wherein the finished acetic acid is distilled overhead and the high boilers are withdrawn from the base. From about 0.005 to 0.03 part by weight of potassium permanganate for each 100 parts by weight of acetic acid fed to the column are introduced into a point in the sixth column above that at which the acetic acid feed stream is introduced and flows downwardly through said column. The potassium permanganate may be in the form of an aqueous solution or in the form of solution in acetic acid or in a mixture of acetic acid and water. The acetic acid obtained in this manner is of high purity and good color and has a permanganate time well in excess of 2 hours, ranging from 8 to 16 hours, or even more in some cases.

According to a second and slightly less desirable manner of carrying out the purification of the acetic acid the first two columns of the arrangement described above are interchanged, i.e., the crude acetic acid stream is first distilled to remove high boilers therefrom and is then distilled to remove low boilers therefrom. Following these two distillations, the subsequent steps in the treatment of the acetic acid are the same as those set forth in the first arrangement described above. However, it is necessary in this case to contact the acetic acid with somewhat larger amounts of potassium permanganate to bring the permanganate time of the acetic acid up to an acceptable value.

In operating according to the second arrangement, the crude acetic acid is introduced into an intermediate point of a column operating at a reflux ratio of between about 1 and 3 to 1, a head temperature of between about 110 and 118° C. and a base temperature of between about 130 and 160° C. wherein acetic acid is distilled overhead and high boilers are removed from the base of the column. The overhead stream from the first column is introduced into an intermediate point in a second column operated at a reflux ratio of between about 5 and 10 to 1, a head temperature of between about 60 and 95° C., and a base temperature of between about 95 and 110° C. wherein low boilers are distilled overhead and the acetic acid stream is withdrawn from the base of the column. The remaining steps in the treatment of the acetic acid are the same as those described under the first arrangement, with the exception that it is necessary to introduce into the sixth column from about 0.02 to 0.04 part of permanganate for each 100 parts by weight of acetic acid fed into the column to bring the permanganate time of the product obtained to a level in excess of 2 hours. While the necessity of using an increased amount of potassium permanganate renders the second arrangement somewhat less desirable than the first arrangement the difference is not great.

According to a third and even less desirable manner of carrying out the purification of the acetic acid the removal of the aqueous acetic and formic acid solution from acetic acid and removal of the remaining water and formic acid from the acetic acid by azeotropic distillation is carried out between the distillation of low boilers from the acetic acid and removal of high boilers from the actic acid, previously called the first and second distillations. As the first step in the process, the crude acetic acid stream is distilled to remove low boilers therefrom. The acetic acid is then distilled to remove a dilute aqueous solution of acetic and formic acids therefrom. The acetic acid is then distilled further to remove the remaining water and also formic acid therefrom with the aid of an azeotroping agent, following which it is distilled again to remove high boilers therefrom. The acetic acid is next distilled to remove light ends therefrom and distilled once more to finish the acetic acid and to remove high boilers therefrom while a solution of potassium permanganate is injected into the column at one or more points.

In operating according to this third arrangement, the crude acetic acid stream is introduced into a first column operating at a reflux ratio of between about 5 and 10 to 1, a head temperature of between about 60 and 95° C., and a base temperature of between about 95 and 110° C. wherein low boilers are distilled overhead. The acetic acid stream from the base of said first column is introduced into an intermediate point in a second column operated at a reflux ratio of between about 1 and 3 to 1, a head temperature of between about 90 and 110° C., and a base temperature of between about 110 and 120° C. wherein some water as well as formic acid and acetic acid are distilled overhead leaving behind a more concentrated solution of acetic acid. The acetic acid from the base of the second column is introduced into an intermediate point of a third column operating at an entrainer to overhead product take-off ratio of between about 30 and 50 to 1, a head temperature of between about 34 and 37° C., at atmospheric pressure, employing pentane as the azeotroping agent, and a base temperature of between about 118 and 150° C. Pentane or hexane is introduced into this column as an azeotroping agent at a rate sufficient to obtain the desired entrainer ratio. There is distilled overhead an azeotrope containing water and formic acid together with the azeotroping agent. The formic acid and water are continuously removed from the azeotroping agent by a phase separation.

The acetic acid stream from the base of the third column is introduced into an intermediate point in a fourth column operated at a reflux ratio of between about 1 and 3 to 1, a head temperature of between about 110 and 118° C., and a base temperature of between about 130 and 160° C. wherein the acetic acid is distilled overhead and the high boilers are withdrawn from the base of the column. The overhead stream from the fourth column is introduced into an intermediate point in a fifth column operated at a reflux ratio of between about 10 and 15 to 1, a head temperature of between about 115 and 118° C., and a base temperature of between about 118 and 120° C. wherein light ends are distilled overhead. The stream of acetic acid from the base of the fifth column is introduced into an intermediate point in a sixth column operated at a reflux ratio of between about 1 and 3 to 1, a head temperature of between about 117 and 119° C., and a base temperature of between about 118 and 120° C. wherein the purified acetic acid is distilled overhead and high boilers are withdrawn from the base. There is introduced into the sixth column between about 0.04 and 0.07 part by weight of potassium permanganate for each 100 parts by weight of acetic acid fed into the column. The need for using such large quantities of potassium permanganate considerably reduces the desirability of this third arrangement. However, it may be suitable in certain applications.

The following example is given to illustrate this invention further.

*Example*

Referring to the drawing, crude acetic acid flows through a conduit 11 into a low boilers column 12 operated at a reflux ratio of 10 to 1, a head temperature of 65° C. and a base temperature of 105° C. Low boilers and some water are drawn overhead through a conduit 13 while the acetic acid, containing water, formic acid, and high boilers is drawn from the base of the column 12 through a conduit 14 into a high boilers column 15. The high boilers column 15 is operated at a reflux ratio of 2 to 1, a head temperature of 117° C. and a base temperature of 155° C. High boilers are drawn from the base of the column through a conduit 16, while acetic acid, together with some water and formic acid, are taken overhead through a conduit 17 into an acid separator column 18. The column 18 is operated at a reflux ratio of 2.5 to 1, a head temperature of 102° C. and a base temperature 119° C. so as to distill overhead through a conduit 19 a mixture containing water together with a small proportion of acetic acid and formic acid. If desired, the mixture leaving the column 18 through the conduit 19 may be treated as by solvent extraction, or the like, to recover the acetic acid therein. The acetic acid leaving the base of the column 18 is taken through a conduit 21 into a pentane azeotrope column 22 into which a stream of pentane is introduced through a conduit 23. The column 22 is operated at an entrainer to overhead product take-off ratio of 49 to 1, a head temperature of 34° C. at atmospheric pressure and a base temperature of 120° C. to distill overhead through a conduit 24 an azeotrope of pentane, water and formic acid. The pentane is recovered from this azeotrope and returned to the column 22 through the conduit 23 as described more fully in the Phelps et al. application referred to above. From the base of the column 22, a stream of acetic acid is withdrawn through a conduit 25 and introduced into a light ends column 26 which is operated at a reflux ratio of 10 to 1, a head temperature of 117° C. and a base temperature of 120° C. to distill overhead through a conduit 27 a mixture containing some acetic acid, a small amount of water and a small amount of reducing materials. From the base of the column 26, acetic acid containing some high boilers is withdrawn through a conduit 28 and introduced into an acetic acid finishing column 29 which is operated at a reflux ratio of 2 to 1, a head temperature of 118° C. and a base temperature of 120° C. There is introduced into the column 29 through a conduit 31 a solution of potassium permanganate in acetic acid and water at a rate of 0.01 part by weight of potassium permanganate for each 100 parts by weight of acetic acid fed to the finishing column. From the base of the column 29 a mixture of acetic acid and high boilers is withdrawn through a conduit 32 and mixed with the feed to the high boilers column 15. There is distilled overhead from the column 29, through a conduit 33, the finished acetic acid which has a concentration of 99.61 weight percent and a permanganate time of 2 hours. The finished acetic acid is also of good color and free from other impurities.

It is to be understood that the foregoing detailed description is given merely by way of illustration and that many variations may be made therein without departing from the spirit of our invention.

Having described our invention what we desire to secure by Letters Patent is:

1. Process for the purification of acetic acid containing water, low and high boilers, formic acid and reducing materials whose boiling point is below that of acetic acid and which reducing materials exist in equilibrium with their condensation products whose boiling point is above that of acetic acid, which comprises subjecting the acetic acid in the absence of azeotroping agents to two distillations in separate columns to remove low boiling and high boiling materials therefrom, subjecting the resulting acetic acid to two later distillations to remove light ends and additional high boiling materials therefrom, and, prior to said two later distillations subjecting the acetic acid to a distillation to remove a dilute aqueous acetic and formic acid solution therefrom and to an azeotropic distillation to remove water and formic acid therefrom.

2. Process for the purification of acetic acid containing water, low and high boilers, formic acid and reducing materials whose boiling point is below that of acetic acid and which reducing materials exist in equilibrium with their condensation products whose boiling point is above that of acetic acid, which comprises subjecting the acetic acid in the absence of azeotroping agents to two distillations in separate columns to remove low boiling and high boiling materials therefrom, and subjecting the acetic acid to a distillation to remove a dilute aqueous acetic and formic acid solution therefrom, and to an azeotropic distillation to remove water and formic acid therefrom and subjecting the resultant acetic acid to two later distillations to remove light ends and additional high boiling materials.

3. Process for the purification of acetic acid containing water, low and high boilers, formic acid and reducing materials whose boiling point is below that of acetic acid and which reducing materials exist in equilibrium with their condensation products whose boiling point is above that of acetic acid, which comprises subjecting the acetic acid in the absence of azeotroping agents to two distillations in separate columns to remove low boiling and high boiling materials therefrom, subjecting the resultant acetic acid to two later distillations to remove light ends and additional high boiling materials therefrom, contacting the acetic acid with potassium permanganate during the later distillation to remove high boiling materials therefrom, and, prior to said two later distillations, subjecting the acetic acid to a distillation to remove a dilute aqueous acetic and formic acid solution therefrom and to an azeotropic distillation to remove water and formic acid therefrom.

4. Process for the purification of acetic acid containing water, low and high boilers, formic acid and reducing materials whose boiling point is below that of acetic acid and which reducing materials exist in equilibrium with their condensation products whose boiling point is above that of acetic acid, which comprises subjecting the acetic acid in the absence of azeotroping agents to two distillations in separate columns to remove low boiling and high boiling materials therefrom, subjecting the acetic acid to a distillation to remove a dilute aqueous acetic and formic acid solution therefrom and to an azeotropic distillation to remove water and formic acid therefrom, subjecting the resultant acetic acid to two later distillations to remove light ends and additional high boiling materials therefrom, and contacting the acetic acid with potassium permanganate during the later distillation to remove high boiling materials therefrom.

5. Process for the purification of acetic acid containing water, low and high boilers, formic acid and reducing materials whose boiling point is below that of acetic acid and which reducing materials exist in equilibrium with their condensation products whose boiling point is above that of acetic acid, which comprises introducing the acetic acid in the absence of azeotroping agents into an intermediate point in a first distillation column wherein low boilers are distilled overhead and acetic acid is withdrawn from the base, introducing the acetic acid stream from the base of the first column into an intermediate point in a second distillation column wherein acetic acid is distilled overhead and high boilers are withdrawn from the base, introducing the overhead stream from the second column into an intermediate point of a third distillation column wherein water, formic acid, and some acetic acid are distilled overhead and acetic acid is withdrawn from the base, introducing the base stream from the third column into an intermediate point in a fourth distillation column into which an azeotroping agent selected from the group consisting of pentane and hexane is introduced and wherein the azeotroping agent, water and formic acid are distilled overhead and acetic acid is withdrawn from the base, introducing the base stream from the fourth column into an intermediate point in a fifth distillation column wherein light ends are distilled overhead and acetic acid is withdrawn from the base, introducing the base stream from the fifth column into an intermediate point in a sixth distillation column wherein purified acetic acid is distilled overhead and high boilers are withdrawn from the base, and introducing potassium permanganate into said sixth column to contact the reducing material in the acetic acid during the distillation.

6. Process for the purification of acetic acid containing water, low and high boilers, formic acid and reducing materials whose boiling point is below that of acetic acid and which reducing materials exist in equilibrium with their condensation products whose boiling point is above that of acetic acid, which comprises introducing the acetic acid in the absence of azeotroping agents into an intermediate point in a first distillation column operated at a reflux ratio of between about 5 and 10 to 1, a head temperature of between about 60 and 95° C., and a base temperature of between about 95 and 110° C. wherein low boilers are distilled overhead and acetic acid is withdrawn from the base, introducing the acetic acid stream from the base of the first column into an intermediate point in a second distillation column operated at a reflux ratio of between about 1 and 3 to 1, a head temperature of between about 110 and 118° C., and a base temperature of between about 130 and 160° C. wherein acetic acid is distilled overhead and high boilers are withdrawn from the base, introducing the overhead stream from the second column into an intermediate point of a third distillation column operated at a reflux ratio of between about 1 and 3 to 1, a head temperature of between about 90 and 110° C., and a base temperature of between about 110 and 120° C. wherein water, formic acid and some acetic acid are distilled overhead and acetic acid is withdrawn from the base, introducing the base stream from the third column into an intermediate point in a fourth distillation column operated at an entrainer to overhead product take-off ratio of between about 30 and 50 to 1, a head temperature of between 34 and 37° C., and a base temperature of between about 118 and 150° C. into which an azeotroping agent selected from the group consisting of pentane and hexane is introduced and wherein the azeotroping agent, water and formic acid are distilled overhead and acetic acid is withdrawn from the base, introducing the base stream from the fourth column into an intermediate point in a fifth distillation column operated at a reflux ratio of between about 10 and 15 to 1, a head temperature of between about 115 and 118° C., and a base temperature of between about 118 and 120° C. wherein light ends are distilled overhead and acetic acid is withdrawn from the base, introducing the base stream from the fifth column into an intermediate point in a sixth distillation column operated at a reflux ratio of between about 1 and 3 to 1, a head temperature of between about 117 and 119° C., and a base temperature of between about 118 and 120° C. wherein purified acetic acid is distilled overhead and high boilers are withdrawn from the base, and introducing between about 0.005 and 0.03 parts by weight of potassium permanganate for each 100 parts by weight of acetic acid fed into said sixth column to contact the acetic acid during the distillation.

7. Process for the purification of acetic acid containing water, low and high boilers, formic acid and reducing material whose boiling point is below that of acetic acid and which reducing materials exist in equilibrium with their condensation products whose boiling point is above that of acetic acid, which comprises introducing the acetic acid in the absence of azeotroping agents into an intermediate point in a first distillation column wherein acetic acid is distilled overhead and high boilers are withdrawn from the base, introducing the overhead stream from the first column into an intermediate point in a second distillation column wherein low boilers are distilled overhead and acetic acid is withdrawn from the base, introducing the base stream from the second column into an intermediate point of a third distillation column wherein water, formic acid, and some acetic acid are distilled overhead and acetic acid is withdrawn from the base, introducing the base stream from the third column into an intermediate point in a fourth distillation column into which an azeotroping agent selected from the group consisting of pentane and hexane is introduced and wherein the azeotroping agent, water and formic acid are distilled overhead and acetic acid is withdrawn from the base, introducing the base stream from the fourth column into an intermediate point in a fifth distillation column wherein light ends are distilled overhead and acetic acid is withdrawn from the base, introducing the base stream from the fifth column into an intermediate point in a sixth distillation column wherein purified acetic acid is distilled overhead and high boilers are withdrawn from the base, and introducing potassium permanganate into said sixth column to contact the acetic acid during the distillation.

8. Process for the purification of acetic acid containing water, low and high boilers, formic acid and reducing materials whose boiling point is below that of acetic acid and which reducing materials exist in equilibrium with their condensation products whose boiling point is above that of acetic acid, which comprises introducing the acetic acid in the absence of azeotroping agents into an intermediate point in a first distillation column operated at a reflux ratio of between about 1 and 3 to 1, a head temperature of between about 110 and 118° C., and a base temperature of between about 130 and 160° C. wherein acetic acid is distilled overhead and high boilers are withdrawn from the base, introducing the overhead stream from the first column into an intermediate point in a second distillation column operated at a reflux ratio of between about 5 and 10 to 1, a head temperature of between about 60 and 95° C., and a base temperature of between about 95 and 110° C. wherein low boilers are distilled overhead and acetic acid is withdrawn from the base, introducing the base stream from the second column into an intermediate point of a third distillation column operated at a reflux of between about 1 and 3 to 1, a head temperature of between about 90 and 110° C., and a base temperature of between about 110 and 120° C. wherein water and formic acid are distilled overhead and acetic acid is withdrawn from the base, introducing the base stream from the third column into an intermediate point in a fourth distillation column operated at an entrainer to overhead product take-off ratio of between about 30 and 50 to 1, a head temperature of between about 34 and 37° C. and a base temperature of between about 118 and 150° C. into which an azeotroping agent selected from the group consisting of pentane and hexane is introduced and wherein the azeotroping agent, water and formic acid are distilled overhead and acetic acid is withdrawn from the base, introducing the base stream from the fourth column into an intermediate point in a fifth distillation column operated at a reflux ratio of between about 10 and 15 to 1, a head temperature of between about 115 and 118° C., and a base temperature of between about 118 and 120° C. wherein light ends are distilled overhead and acetic acid is withdrawn from the base, introducing the base stream from the fifth column into an intermediate point in a sixth distillation column operated at a reflux ratio of between about 1 and 3 to 1, a head temperature of between about 117 and 119° C., and a base temperature of between about 118 and 120° C., wherein purified acetic acid is distilled overhead and high boilers are withdrawn from the base, and introducing between about 0.02 and 0.04 parts by weight of potassium permanganate for each 100 parts by weight of acetic acid fed into said sixth column to contact the acetic acid during the distillation.

References Cited in the file of this patent

UNITED STATES PATENTS

| | | |
|---|---|---|
| 1,813,636 | Petersen et al. | July 7, 1931 |
| 2,038,865 | Wentworth et al. | Apr. 28, 1936 |
| 2,184,563 | Othmer | Dec. 26, 1939 |
| 2,186,617 | Othmer | Jan. 9, 1940 |
| 2,384,374 | Harrison | Sept. 4, 1945 |
| 2,411,567 | Fisher | Nov. 26, 1946 |
| 2,423,545 | Aesbach | July 8, 1947 |
| 2,438,300 | Schniepp | Mar. 23, 1948 |
| 2,541,486 | Teeter et al. | Feb. 13, 1951 |
| 2,688,635 | Eberts et al. | Sept. 7, 1954 |

FOREIGN PATENTS

| | | |
|---|---|---|
| 721,301 | Great Britain | Jan. 5, 1955 |

OTHER REFERENCES

"Manual Industrial Chemistry," by Rogers, 4th ed. (1926), vol. II, p. 701.

"Chemical Engineers Handbook," Perry, 3rd ed. (1950), sec. 9., pp. 561–665.

"Azeotropic Data," American Chemical Society 1952.

Lecat: "Tables Azeotropique," published July 1949, pp. 18 and 19.

The Merck Index, 6th ed., copyright 1952, by Merck & Co. Inc.